(12) United States Patent
Bogomolnyi

(10) Patent No.: US 6,550,922 B2
(45) Date of Patent: Apr. 22, 2003

(54) AUDIO-VIDEO RECORDING OF OVERHEAD PROJECTOR BASED PRESENTATIONS

(75) Inventor: Constantin Bogomolnyi, Antony (FR)

(73) Assignee: Hewlett-Packard Company, Fort Collins, CO (US)

(*) Notice: Subject to any disclaimer, the term of this patent is extended or adjusted under 35 U.S.C. 154(b) by 55 days.

(21) Appl. No.: 09/876,077

(22) Filed: Jun. 8, 2001

(65) Prior Publication Data

US 2001/0050755 A1 Dec. 13, 2001

(30) Foreign Application Priority Data

Jun. 9, 2000 (GB) .............................. 0013963

(51) Int. Cl.[7] ................. G03B 21/00; G03B 31/00; G03B 31/06; G03B 21/14; G03B 31/02
(52) U.S. Cl. ................. 353/122; 353/15; 353/19; 353/22; 353/120; 349/6; 352/26; 352/27; 352/31
(58) Field of Search ................. 353/15, 19, 22, 353/120, 122, 63; 352/26, 27, 31; 349/6

(56) References Cited

U.S. PATENT DOCUMENTS

| | | | | |
|---|---|---|---|---|
| 3,687,529 A | | 8/1972 | Goshima et al. ............ 352/27 |
| 3,762,809 A | * | 10/1973 | Kato et al. .................... 353/66 |
| 5,001,696 A | * | 3/1991 | Baldwin ...................... 364/521 |
| 5,162,827 A | * | 11/1992 | Marshall ...................... 353/120 |
| 5,302,985 A | * | 4/1994 | Kennedy et al. ............ 353/122 |
| 5,317,350 A | * | 5/1994 | Nomura et al. ............... 353/63 |
| 5,593,221 A | * | 1/1997 | Evanicky et al. ............ 353/122 |
| 6,084,582 A | * | 7/2000 | Quereshi et al. ............ 345/302 |
| 6,108,001 A | * | 8/2000 | Tuttle .......................... 345/302 |

FOREIGN PATENT DOCUMENTS

EP 0 625 771 11/1994 ............ G09B/5/06

* cited by examiner

Primary Examiner—Russell Adams
Assistant Examiner—Melissa J. Koval

(57) ABSTRACT

The present invention relates to the audio-video recording of overhead projector based presentations. The apparatus (1) comprises an audio microphone (29), a logging element (20, 21, 27) for logging when a presenter changes a viewable object such as an overhead transparency (6) on an overhead projector, and a recording apparatus (25), wherein: the microphone (29) generates an audio signal from the audio portion of the presentation; the logging element (20, 21, 27) is activatable to generate a marker signal indicating the change of viewable object (6); and the recording apparatus (25) receives the audio signal from the microphone (29) and the marker signal from the logging element (20, 21, 27) to record the signals as audio data and marker data so that audio data is correlated with the marker data.

23 Claims, 2 Drawing Sheets

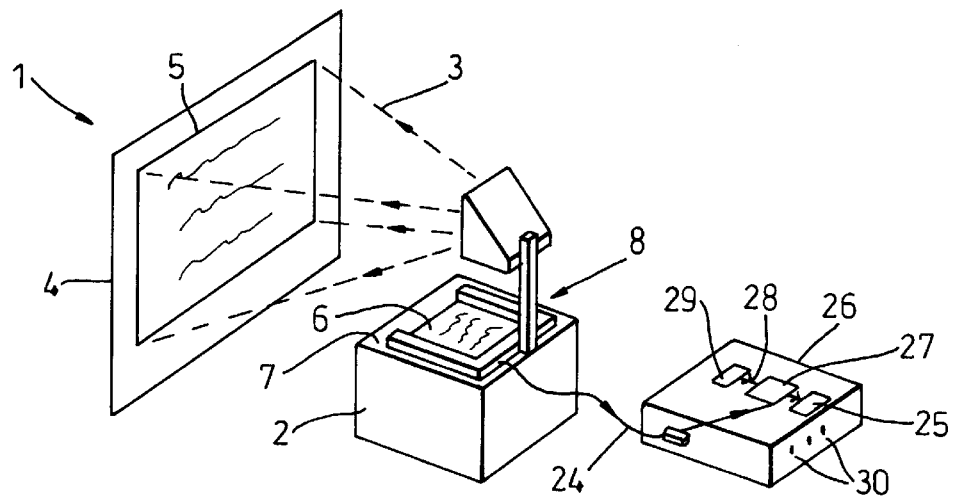
Fig. 1
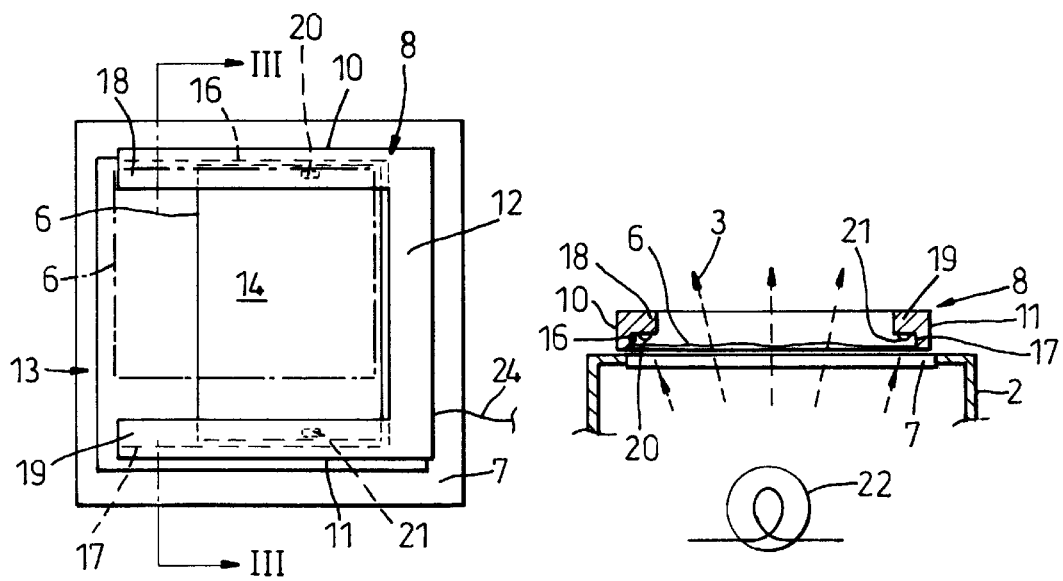
Fig. 2  Fig. 3

AUDIO-VIDEO RECORDING OF OVERHEAD PROJECTOR BASED PRESENTATIONS

The present invention relates to the audio-video recording of overhead projector based presentations.

Presentations to an audience are often made by a presenter with the aid of an overhead projector (OHP). One type of OHP has an upward-facing horizontal clear glass plate which is back-illuminated by the projector by a white light source so that projected light is directed upwards through the projection plate. Another type of OHP has an upward-facing mirrored plate which is front-illuminated so that light projected downwards onto the mirror is reflected upwards by the mirror. An object on either type of plate is thus illuminated so that light passing through or to one side of the object is projected upwards and then laterally onto a viewing screen. All such OHP plates are referred to herein as "projection plates".

In one type of presentation, the presenter lays a series of clear or translucent plastic sheets one at a time on the projection plate while giving a talk. The sheets may contain written information, drawings, graphs, photographs or any other type of visual information. Sometimes, the presenter may write on the sheets as part of the presentation. Such sheets are referred to herein as "OHP transparencies".

In another type of presentation, an active matrix liquid crystal screen is placed on the projection plate. The screen may be connected to a personal computer which then sends signals to the screen to activate pixels of the liquid crystal screen to display computer generated images. When activated, the pixels act as light shutters to alter the amount and colour of light passing through the screen. Such active matrix light shutters are referred to herein as "electronic transparencies".

OHP transparencies, electronic transparencies, and all other such objects which may be placed on an OHP projection plate as part of an audio-video presentation are referred to herein as "viewable objects".

If a person wishes to make a recording of an OHP presentation, then it is quite straightforward to make an audio-only recording of the presenter's voice and to copy or print out paper images of the viewable objects, or to scan or capture these as computer-viewable images. However, a person listening to the audio recording while looking at the images may have difficulty in following the sequence of the images with the person's voice. In addition, such an audio-only recording may miss important information, such as the presenter writing on the viewable objects, presenting viewable objects out of sequence, or pointing to parts of the viewable objects on the projection plate or on the projection screen.

One way to deal with this problem is to make an audio-video recording of the presentation with a camcorder set up to capture images of both the presenter and the OHP images as projected onto a screen. This, however, is not entirely satisfactory, as the video resolution of such recordings, at least for inexpensive camcorders, is insufficient to capture each projected image with adequate resolution. Preferably such resolution should be at least about 300 dpi for an A4-sized viewable object. Such resolution may be achieved by training a video camera exclusively on a projected image, but such a recording uses a significant amount of storage on a video recording medium, which is inconvenient to deal with even though such generally static images can subsequently be compressed.

It is an object of the present invention to provide a more convenient apparatus and method for making an audio-video recording of an OHP based presentation.

According to the invention, there is provided an apparatus for making an audio-video recording of an OHP based presentation, comprising an audio microphone, a logging means for logging when a presenter changes a viewable object on an OHP, and a recording apparatus, wherein: the microphone generates an audio signal from the audio portion of the presentation; the logging means is activatable to generate a marker signal indicating the change of viewable object; and the recording apparatus receives the audio signal from the microphone and the marker signal from the logging means to record said signals as audio data and marker data so that audio data is correlated with the marker data.

Also according to the invention, there is provided a method of making an audio-video recording of an OHP based presentation, using an apparatus comprising an audio microphone, a logging means for logging when a presenter changes a viewable object on an OHP, and a recording apparatus, wherein the method comprises the steps of:

a) using the microphone to generate an audio signal from the audio portion of the presentation;

b) changing a viewable object on a projection plate, and activating the logging means to generate a marker signal indicating the change of viewable object; and c) using the recording apparatus to record the audio signal from the microphone and the marker signal from the logging means as respectively audio data and marker data so that audio data is correlated with the marker data.

Changes in viewable objects may then at a later time be correlated with changes in the viewable objects during the presentations.

The data may be analogue data, but is preferably digital data, for example digitally compressed audio data, and digital data indicating the points in the audio data at which viewable objects were changed by the presenter.

The apparatus may then, for example, record respectively the audio portion of the presentation, and the times during the audio portion of the presentation when viewable objects are changed.

The logging means may be manually activated by the presenter, or another person, whenever the presenter advances to the next viewable object, for example by pressing a button. It is preferable, however, if the logging means is automatically activated whenever the presenter changes the viewable object.

The logging means may indicate simply that the presenter has moved on to the next slide. Preferably, the logging means is adapted to detect when a presenter places an overhead transparency on a projection plate and/or removes said transparency from a projection plate.

If the order of the slides is known, then the correct slides can later be correlated with the marker signals.

There may be times when the presenter will present slides in other than a predetermined sequential order, for example digressing to a previously shown slide. It is therefore helpful if the marker signal contains information regarding the identity of the viewable object.

In a preferred embodiment of the invention, the logging means includes a sensor to detect whether or not an OHP transparency has been placed on the projection plate.

The OHP transparencies may comprise a clear or translucent sheet of plastics material. Such sheets may include non-transparent or non-translucent borders, for example an opaque plastic border along one or more edges, or a paper frame. The sensor may then be arranged to detect such a border or frame, either from its physical properties, or its optical properties.

The logging means may comprise an OHP alignment device, adapted to be placed or affixed atop a projection plate. The alignment device then includes at least one alignment edge against which a corresponding straight edge of an OHP transparency may be brought. The sensor is then adapted to detect the presence of the OHP transparency as the OHP transparency is aligned against the alignment edge. The alignment edge may be a continuous, straight alignment edge.

The sensor may be an optical sensor that senses a change in optical radiation mediated by the OHP transparency. The mediation of optical radiation may be by means of transmission through or reflection or scattering from the OHP transparency towards the optical sensor, and the optical sensor may detect either visible light, or invisible light, particularly infra-red optical radiation.

The logging means may include an integral light source arranged to transmit optical radiation to the optical sensor through/from the OHP transparency. It is preferred, however, if the optical sensor is arranged to detect optical radiation produced by an overhead projector when the OHP alignment device is on the projection plate.

It is possible, however, to use other types of sensor, for example a magnetic sensor adapted to detect a magnetic portion of an OHP transparency, particularly a magnetic strip, as the strip is moved relative to the magnetic sensor. Other types of sensor may alternatively be used, for example a pressure sensor, or a distance or gap sensor.

In any of these cases, it is particularly advantageous if the sensor is adapted to detect bar-encoded data on the OHP transparency.

Therefore, according to the invention there is also provided an OHP transparency for use with an apparatus according to the invention when this has means for sensing bar-encoded data, wherein the OHP transparency has along at least one edge thereof bar-encoded data.

For example, the bar-encoded data may be a series of dark/light or opaque/transparent or translucent stripes or areas. As the OHP transparency is placed on the projection plate, the movement of these stripes or areas is then detected by the sensor in the logging means.

In any event, it is particularly advantageous if each viewable object is individually distinguishable at the time the marker data is generated. If OHP transparencies are uniquely identifiable, for example by bar coding, then the logging means may capture the identity of each OHP transparency as this is changed. The presenter then need not be concerned with the exact order in which the OHP transparencies are shown. If the presenter digresses, and shows a previously presented OHP transparency, then this information will be captured with the marker information.

In a preferred embodiment of the invention, the logging means includes at least one pair of oppositely parallel arms between which an OHP transparency may be aligned when placed when on a projection plate. Such arms may have a channel or undercut into which an edge of the OHP transparency slides when it is placed on or removed from the projection plate.

In a particular preferred embodiment of the invention, the logging means includes four parallel arms arranged as a first pair of oppositely parallel arms and a second pair of oppositely parallel arms, the separation between the first pair of arms being greater than the separation between the second pair of arms, so that a rectangular OHP transparency can be placed on the projection plate in a landscape orientation between one pair of arms, and in a portrait orientation between the other pair of arms.

Each pair of parallel arms may then have a corresponding end stop for orienting an OHP transparency in a direction parallel to the arms. Preferably, the two pairs of arms and corresponding end stops are arranged so that the position of a centre point of a rectangular OHP transparency when aligned by one pair of arms and oriented by a corresponding end stop is the same as the position of the same centre point when the rectangular OHP transparency is aligned by the other pair of arms and oriented by the other corresponding end stop.

The apparatus may include a scanner for scanning an OHP transparency as this is being placed on a projection plate, or for scanning the OHP transparency as this is being removed from a projection plate. The scanner may be integral with or at least linked to portions of the apparatus on the projection plate, for example, automatically scanning OHP transparencies as these are removed from the projection plate.

In one embodiment of the invention for use with LCD light shutters and the like, the logging means is adapted to detect when a signal for an electronic transparency is transmitted for changing the viewable object on a projection plate.

The logging means may then be activated when a presenter changes a viewable object on an OHP, for example by activating a screen advance "button" with personal computer presentation software.

The apparatus may then capture image data for the viewable objects in the presentation, and use the recording apparatus to record the image data together with the marker data so that the image data and marker data are correlated with each other.

The invention may also be used with a conventional video capture device, for example an inexpensive camcorder of modest resolution. This may be set with a wide field of capture, showing the presenter, overhead projector, and projection screen. If the presenter leans over the overhead projector, for example to write on an OHP transparency, or points to a particular part of an image projected onto the screen, this will be captured by the video capture device at the same time as the apparatus captures the audio data. The relatively low resolution video data can then be combined with the captured audio data, marker data and optionally also captured images of the viewable objects, for example being displayed side-by-side on a television screen or other video display unit, so that a person seeing the audio-video recording can see when and where the presenter is annotating or pointing to each of the viewable objects.

The invention will now be described by way of example, with reference to the accompanying drawings, in which:

FIG. 1 is a perspective view of an overhead projector with an apparatus according to a first embodiment of the invention for making an audio-video recording of an OHP based presentation;

FIG. 2 is a top view of the apparatus of FIG. 1 on a projection screen of the overhead projector;

FIG. 3 is a cross-sectional view along line III—III of FIG. 2;

FIG. 1 shows equipment 1 used in making an overhead projector (OHP) based presentation. The equipment 1 includes a conventional overhead projector 2 arranged to project 3 an image 5 of an overhead transparency 6 onto a projection screen 4. The transparency 6 sits on a projection plate 7 on top of the overhead projector 2.

Figure 4:
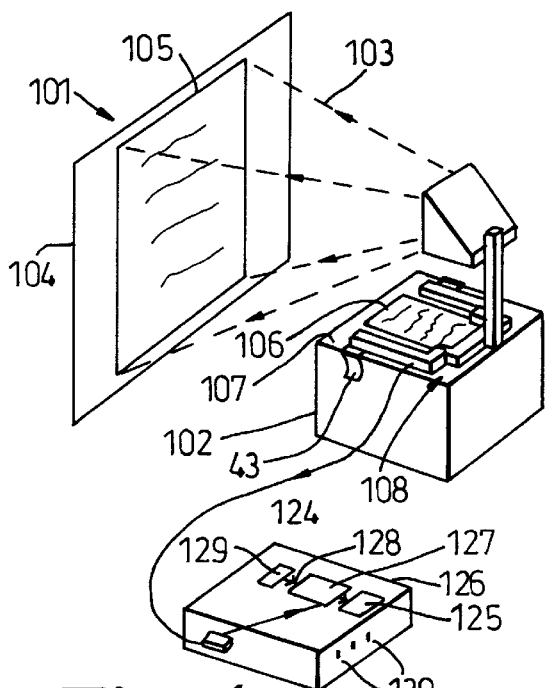
FIG. 4 is a perspective view of an overhead projector with an apparatus according to a second embodiment of the invention for making an audio-video recording of an OHP based presentation.

The transparency 6 is held within a U-shaped frame 8 that sits on the projection plate 7. As shown more clearly in FIGS. 2 and 3, the frame 8 has a pair of parallel spaced-apart arms 10,11 between which extend a straight base 12. The frame 8 has an open end 13 leading to a square or rectangular area 14 enclosed by the frame 8. The area 14 is dimensioned so that the transparency 6 can be inserted through the open end 13 of the frame 8 either in a landscape orientation as shown in the solid outline, or in portrait orientation, as shown in dashed outline. The frame 8 can be dimensioned to accept various types of standard overhead transparencies 6, for example either standard metric A4 size, or standard North American size 215.9 mm×279.4 mm (8½ inch×11 inch).

The parallel arms 10,11 have an undercut 16,17 so that there is an overhang 18,19 over the edges of the transparency 6 when this is inserted into the frame 8. There is no such overhang in the bar 12 extending between the arms 10,11. The overhang 18,19 serves several purposes. One is to retain the transparency 6 on the projection plate 7 so that the transparency does not move about. Another is to make the presenter insert the transparency 6 into the frame 8 through the open end 13 so that the transparency moves horizontally towards the base 12 past a photodetector 20,21 in each arm used to detect the presence of a transparency 6 in the frame 8. The photodetectors are arranged so that these are oriented downwards and concealed by one of the overhangs 18,19 to detect the intensity of light received from a light source 22 within the overhead projector 2. When a transparency 6 is inserted or removed from the frame 8 there will be a momentary dimming of this received light owing to scoutering losses at the edge of the transparency 6.

The frame 8 is connected 24 to a presentation logging unit 26. The logging unit 26 has electronics 27 including a microprocessor that monitors the light level detected by the photodetectors 20,21. Electronics 27 are also connected 28 to a microphone 29 that detects the audio portion of the presentation and to a memory 25 that records the audio portion of the presentation. The memory 25 may be a solid state memory, or a fixed or removable data carrier. The unit has various controls 30 for initiating the capture of the presentation, adjusting the audio recording level, and for stopping recording of the presentation. Together with the photodetectors 20,21, the electronics 27 form a logging means for logging when a presenter changes a transparency 6 on the OHP 2. The logging means 20,21,27 generates a marker signal that is stored by the memory 25 along with timing signals so that the audio portion of the presentation and the marker signals are correlated with each other.

After presentation has been made, overhead transparencies 6 can be scanned and stored as computer files, and then combined with the recorded audio portion of the presentation into a combined audio-video recording. In this process, the order of the transparency 6 must be maintained, and correlated with markers recorded by the units 26 upon each change of transparency 6.

Figure 5:
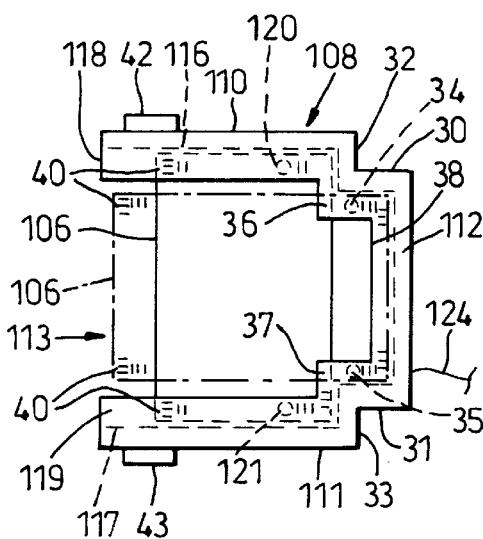
FIG. 5 is a top view of the apparatus of FIG. 4.

FIGS. 4 and 5 show a second embodiment of equipment 101 for making and recording an audio-video OHP based presentation. In these drawings, features similar to those for the first embodiment 1 are indicated by reference numerals incremented by 100. The second embodiment 101 differs from the first embodiment 1 in several ways. First, the frame 108 has two pairs of parallel arms, one pair 110,111 having a wider spacing than the other pair 30,31. The outer pair of arms 110,111 is adjacent the opening 113 to the frame 108 and has a spacing so that the transparency 106 can be retained within the frame in a landscape orientation. The inner pair of arms 30,31 are closer together, so that the transparency 106 can be retained in the frame 108 in a portrait orientation as shown in dashed outline. The frame 108 has a base 112 opposite the opening 113 that acts as an end stop for the transparency 106 in the portrait orientation. The frame has steps 32,33 between the pairs of arms 110,111;30,31 that act as end stops for the transparency 106 in the landscape orientation.

A pair of spring clips 42,43 extend downwards from the outer pair of arms 110,111. When the frame 108 is placed on the viewing plate 107, the clips press against opposite sides of the overhead projector 102, so that the frame is held securely centered on the viewing plate.

The frame 108 also has two pairs of photodetectors 120,121;34,35, one in each of the arms 110,111;30,31. As with the first embodiment 1, the photodetectors 120,121;34,35 are concealed in corresponding overhangs 118,119;36,37 in each of the arms. The base 112 of the frame 108 also has an overhang 38, so that overhangs extend fully around the inside of the frame 108.

The photodetectors 120,121;34,35 differ from those for the first embodiment 1 in that each of these is a combined infrared transmitter-receiver pair, so that infrared light is directed downwards towards the projection plate 107 so that when a transparency 106 is inserted into the frame 108, the presence of the transparency 106 is detected by reflected or back-scattered light. The detection is therefore not dependent on whether or not a light source within the overhead projector 102 is switched on.

The transparency 106 may optionally include a label or another pre-printed area that can be read by each of the detectors 120,121;34,35. In this example, the label is a bar code 40. The bar code 40 may be printed in each corner of the rectangular transparency 106 and may be oriented along each edge of the transparency so that the bar code can be read by a photodetector 120,121;34,35 whether the transparency 106 is inserted in the frame 108 in a landscape orientation or a portrait orientation. The overhangs 118, 119;36,37 help to conceal some or all of the bar codes 40 in the projected image 105.

The electronics 127 in the logging unit then monitor the signal received from the detectors 120,121;34,35 to detect not only changes of transparency 106, but also the identity of each transparency. The presenter therefore does not need to keep track of the order of the transparencies 106 in the presentation, and may use transparencies more than once. When the audio-video presentation is compiled using the audio and marker signals recorded by the memory 125, then it is only necessary to generate and store image files of the transparencies 106 together with an appropriate code associated with the bar codes 40.

In both the first and second embodiments 1,101 the transparencies 6,106 may be scanned by an appropriate scanner. However, if the transparencies 6,106 have been generated using a computer presentation package, then image files may already exist for each of the transparencies 6,106.

Figure 6:
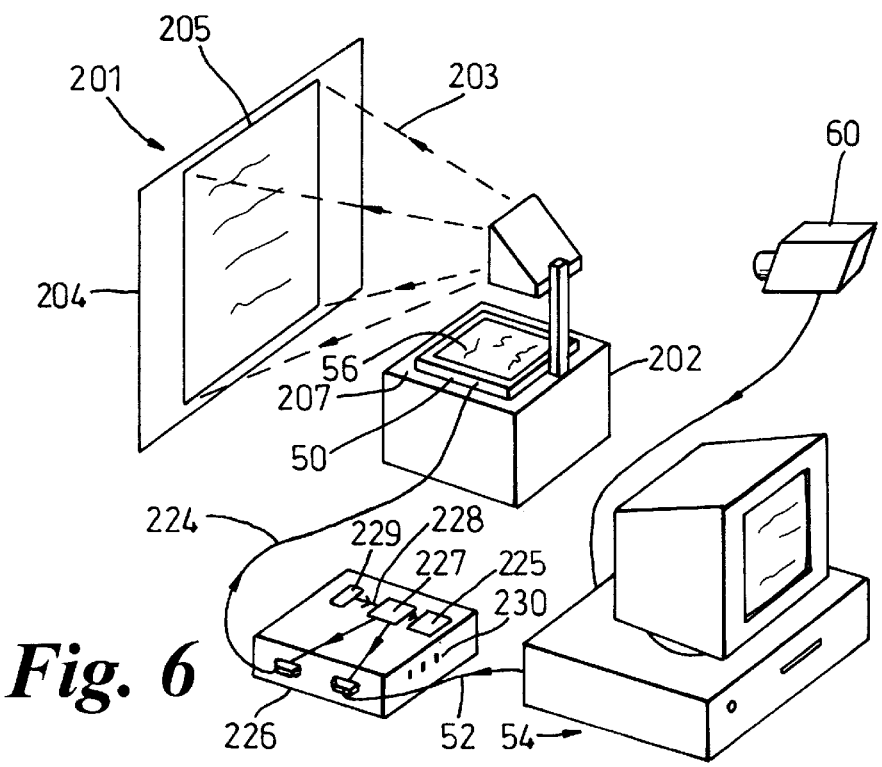
FIG. 6 is a perspective view of an overhead projector with an apparatus according to a third embodiment of the invention for making an audio-video recording of an OHP based presentation.

FIG. 6 shows a third embodiment of the invention 201, where features similar to those of the first embodiment are indicated by reference numerals incremented by 200. Here, instead of overhead transparencies, a conventional liquid crystal light shutter device 50 is placed on the projection plate 207 of the overhead projector 202. The light shutter device 50 is connected 224 to the logging unit 226 which is itself connected 52 to a conventional personal computer 54. The computer 54 runs presentation generation software for driving the light shutter device 50 so that presentation images 56 are generated by the light shutter device 50. Electronics 227 in the logging unit 226 pass signals received from the computer 54 to the light shutter device 50 and record in the memory 225 changes in these images together with the audio portion of the presentation received from the microphone 229. Preferably, signals received from the computer 54 include data identifying each of the images 56 to help with compilation of the audio-video recording. Optionally, the logging unit 226 may be incorporated in electronics within the computer 54 so that the audio-video recording can be compiled in real time during the presentation.

Optionally, the microphone 29,129,229 may be a radio microphone worn by the presenter and arranged to transmit signals to a receiver connected to the controlling electronics 27,127,227.

Although in the examples described above, the logging device is activated by the change of a viewable object to generate a marker signal indicating the change of viewable object, the logging device or frame could alternatively be provided with a switch or other suitable means by which the presenter could manually log the change of a transparency or other viewable object.

In one variant of the invention, an inexpensive camcorder 60 may capture a wide angle and relatively low resolution video image of the presenter, and projected images 5,105, 205. This can be compiled with the audio-video recording so that a person playing back the recording on a computer can see not just high resolution images of the scanned or captured transparencies 6,106 or light shutter image 56, but also for example in a corner of the computer display also a wide angle low resolution image of the presenter. This is particularly useful if the presenter writes on the transparencies 6,106, or points to part of the projected images 5,105, 205. This also makes the compiled audio-video recording more interesting and captures more completely the overall effect of the presentation.

It should be noted that although in the given examples the logging unit is described as a dedicated unit, it would be possible to incorporate all the functions of the logging unit within other equipment, for example by making the logging unit integral with an overhead projector, or a personal computer.

The compiled audio-video recordings may be stored on any suitable recording medium, for example recordable CD-ROMs, or can be made available as web pages on an intranet or the Internet. This provides many benefits. For example, university lectures can be captured using apparatus according to the invention, and then made available to students enrolled in courses at the university. In addition or as an alternative to attending lectures, students can then also view presentations again or in their own time. This makes studying and distance learning more effective.

In the case of business presentations made in-house or at a conference, presentations can be distributed after the event, either freely or on a subscription basis.

A particular advantage of the invention is that it makes use of relatively inexpensive new hardware and well known widely used presentation equipment. It is also not necessary for the presenter to learn new presentation techniques or to master new equipment in the giving of the presentation. The invention is therefore useful with a wide range of situations when it is desired to record an OHP based presentation.

What is claimed is:

1. An apparatus for making an audio-video recording of a projection enhanced presentation, comprising an audio microphone, a logging element for logging when a presenter changes a viewable object on an overhead projector, and a recording apparatus, wherein: the audio microphone generates an audio signal from an audio portion of the presentation; the logging element is activatable to generate a marker signal indicating the change of viewable object; and the recording apparatus receives the audio signal from the microphone and the marker signal from the logging element to record said audio and marker signals as audio data and marker data so that the audio data is correlated with the marker data.

2. An apparatus as claimed in claim 1, in which the logging element is adapted to detect when a presenter places a transparency on a projection plate of the overhead projector or by removing said transparency from the projection plate.

3. An apparatus as claimed in claim 2, in which the logging element includes a sensor to detect whether or not the transparency has been placed on the projection plate.

4. An apparatus as claimed in claim 3, in which the logging element comprises an alignment device, adapted to be positioned atop a projection plate, the alignment device including at least one alignment edge against which a corresponding straight edge of the transparency may be brought, the sensor being adapted to detect the presence of the transparency as the transparency is aligned against the alignment edge.

5. An apparatus as claimed in claim 4, in which the logging element includes at least one pair of arms between which the transparency may be aligned when placed when on the projection plate.

6. An apparatus as claimed in claim 5 in which the logging element includes four parallel arms arranged as a first pair of arms and a second pair of arms, the separation between the first pair of arms being greater than the separation between the second pair of arms, so that the transparency can be placed on the projection plate in a landscape orientation between one of the first and second pairs of arms, and in a portrait orientation between the other of the first and second pairs of arms.

7. An apparatus as claimed in claim 6, in which each pair of arms has a corresponding end stop for orienting the transparency in a direction parallel to the arms.

8. An apparatus as claimed in claim 7, in which the two pairs of arms and corresponding end stops are arranged so that the position of a centre point of the transparency when aligned by one pair of arms and oriented by a corresponding end stop is the same as the position of the same centre point when the transparency is aligned by the other pair of arms and oriented by the other corresponding end stop.

9. An apparatus as claimed in claim 3, in which the sensor is an optical sensor that senses a change in optical radiation mediated by the transparency.

10. An apparatus as claimed in claim 9, in which the logging element includes an integral light source arranged to transmit optical radiation to the optical sensor through the transparency.

11. An apparatus as claimed in claim 9, in which the optical sensor is arranged to detect optical radiation produced by an overhead projector when the alignment device is on a projection plate.

12. An apparatus as claimed in claim 3, in which the sensor is a magnetic sensor adapted to detect a magnetic portion of a transparency.

13. An apparatus as claimed in claim 3, in which the sensor is adapted to detect bar-encoded data on a transparency.

14. An apparatus as claimed in claim 13, comprising at least one transparency with a bar code along at least one edge thereof.

15. An apparatus as claimed in claim 1, comprising a scanner for scanning a transparency as this is being placed on a projection plate, or for scanning the transparency as this is being removed from a projection plate.

16. An apparatus as claimed in claim 1, comprising an overhead projector on which a transparency may be placed.

17. An apparatus as claimed in claim 16, comprising the transparency on a projection plate.

18. An apparatus as claimed in claim 1, in which the logging element is adapted to detect when a signal for an electronic transparency is transmitted for changing the viewable object on a projection plate.

19. A transparency for use with an apparatus for making an audio-video recording of a projection enhanced presentation, wherein the transparency has along at least one edge thereof bar-encoded data indicative of the identity of the transparency.

20. A method of making an audio-video recording of a projection enhanced presentation, using an apparatus comprising an audio microphone, a logging element for logging when a presenter changes a viewable object on an overhead projector, and a recording apparatus, wherein the method comprises the steps of:

a) using the microphone to generate an audio signal from an audio portion of the presentation;

b) changing a viewable object on a projection plate, and activating the logging element to generate a marker signal indicating the change of viewable object; and c) using the recording apparatus to record the audio signal from the microphone and the marker signal from the logging element as respectively audio data and marker data so that audio data is correlated with the marker data.

21. A method as claimed in claim 20, in which the marker signal contains information regarding the identity of the viewable object.

22. A method as claimed in claim 21, comprising the steps of:

a) capturing image data for the viewable objects in the presentation; and b) using the recording apparatus to record the image data together with the marker data so that the image data are correlated with the audio data.

23. An apparatus for making an audio-video recording of a projection enhanced presentation, said apparatus comprising a video camera; an audio microphone, a logging element for logging when a presenter changes a viewable object on an overhead projector, and a recording apparatus, wherein: the video camera generates video data of the presentation; the audio microphone generates an audio signal from an audio portion of the presentation; the logging element is activatable to generate a marker signal indicating the change of the viewable object; and the recording apparatus receives the video data from the video camera and the audio signal from the microphone and the marker signal from the logging element to record said audio and marker signals as audio data and marker data so that audio data is correlated with the marker data and to combine said video data with said audio and marker data.

* * * * *